United States Patent [19]

Wimmer

[11] 3,720,540

[45] March 13, 1973

[54] PRODUCTION OF GLASS FIBER-REINFORCED PLASTIC ARTICLES

[76] Inventor: Robert Wimmer, Linzer-Strasse 246, A 4600 Wels, Austria

[22] Filed: July 14, 1970

[21] Appl. No.: 54,843

[52] U.S. Cl. ........... 117/139, 117/104 R, 117/161 K, 117/161 UZ, 161/231, 161/255, 161/256, 260/40 R, 260/41.5 A
[51] Int. Cl. ............................................. B44d 1/08
[58] Field of Search......161/232, 252, 231, 251, 255, 161/256, 204; 260/33.6, 40 R, 41.5; 220/64; 117/138.8 E, 138.8 N, 139, 161 K, 161 UZ, 104 R; 264/129

[56] References Cited

UNITED STATES PATENTS

| 3,356,253 | 12/1967 | Wimmer | 220/64 |
| 3,511,792 | 5/1970 | Helm et al. | 260/40 X |
| 3,510,447 | 5/1970 | Bourguignon | 260/40 |
| 3,479,303 | 11/1969 | Wieschollek et al. | 260/40 X |
| 3,503,921 | 3/1970 | Souzd et al. | 260/40 R |

Primary Examiner—Edward G. Whitby
Attorney—Burns, Doane, Swecker & Mathis

[57] ABSTRACT

Glass fiber-reinforced plastic articles such as bathtubs are produced by shaping, e.g., vacuum forming, thermoplastic material such as acrylic sheeting into a body and then applying a sprayable mixture of thermosetting unsaturated polyester resin material and a bond-improving additive consisting of a monomeric styrene compound and chalk or talc to the body to form a coating thereon. Reinforcing glass fibers are embedded in the thermosetting coating which is cured to form the resultant reinforced plastic article. The coating and the reinforcing glass fibers are preferably applied using a "spray-up" system, i.e., coating by means of a spray gun.

10 Claims, No Drawings

PRODUCTION OF GLASS FIBER-REINFORCED PLASTIC ARTICLES

BACKGROUND OF THE INVENTION

1. Field of the Invention

This invention relates to improvements in or relating to the production of glass fiber-reinforced plastic articles.

2. Summary of the Prior Art

Thermoplastics may be softened by heating and set or hardened again by cooling without undergoing a chemical change; this physical change is reversible, i.e., the application of further heat again softens the thermoplastic material. Thermoplastics may, therefore, be molded like wax or metal by heating, shaping in a mold, and then cooling. Acrylics, such as poly(methyl methacrylate), are typical thermoplastics. The heat resistance and structural strength of thermoplastic materials, however, are often low for many applications; but in combination with certain reinforcing materials such as thermosetting plastic coatings, their heat resistance and structural strength are significantly improved.

Thermosetting plastics, in contrast to thermoplastics, become increasingly infusible on heating, undergoing a chemical change which is not reversible. This reaction or chemical change is normally called curing. Unsaturated polyester resin is a typical example of thermosetting material. When used alone, however, thermosetting polyester materials are still not strong or tough enough as reinforcing coatings for many applications; but when combined or mixed with certain additional reinforcing filler materials, usually some form of glass fiber, they exhibit improved structural strength after curing which make them eminently suitable as reinforcing coatings on thermoplastic substrates.

Essentially, then, reinforced plastics may consist of combinations of thermoplastics and thermosetting polyester material containing strengthening fillers, such as glass in fibrous form, which provide the structural designer with a way to create plastic articles whose properties may be predictable and controllable.

For example, plumbing fixtures have been manufactured by vacuum forming an acrylic thermoplastic liner and then spraying a coating of thermosetting unsaturated polyester resin material onto the vacuum formed liner, with glass fibers being embedded in the sprayed coating (see U.S. Pat. No. 3,356,253 ). The acrylic liner gives the plumbing fixture an impermeable enamel-like surface, and the thermosetting glass fiber-reinforced coating of unsaturated polyester resin when cured provides strong support to the thermoplastic liner at elevated temperatures during use.

While the above-described polyester-on-thermoplastic, glass fiber-reinforced articles are useful, the search has continued for ways to improve the bond between thermosetting polyester coatings and thermoplastic substrates, particularly acrylic substrates, so as to decrease any chance of delamination and to insure an integral structure having improved structural strength and improved resistance to all of the destructive elements and forces to be encountered in their environments.

The present invention was made as a result of such a search.

SUMMARY OF THE INVENTION

Accordingly, a primary object of the present invention is to provide improvements in the above-discussed production of glass fiber-reinforced plastic articles.

Another object is to provide novel sprayable thermosetting polyester compositions which improve bonding in the production of glass fiber-reinforced plastic articles, to provide novel processes for the production of such articles, and to provide the plastic articles produced thereby.

Other objects and advantages of the present invention will become apparent from this summary and the description of the preferred embodiments.

In accordance with the present invention, glass fiber-reinforced plastic articles are produced by shaping or forming thermoplastic material into a body, and then applying a sprayable fluid coating composition, or mixture, of thermosetting unsaturated polyester resin material and a bond-improving additive consisting of a monomeric styrene compound and chalk or talc to the thermoplastic body to form a coating thereon, with reinforcing glass fibers being embedded in the coating which is thereafter cured.

The essence of the present invention is the discovery that adding a monomeric styrene compound, such as styrene itself, and chalk or talc to a general purpose thermosetting unsaturated polyester resin material results in an improved bond between the thermosetting coating and the thermoplastic substrate, particularly when the substrate is made of acrylic or acrylonitrile-butadiene-styrene (ABS) material. The improved bond in turn gives increased structural strength such as increased impact strength to the resultant article. The exact mechanism or theory by which the improved bonding is gained is not known, however, and the present invention is not to be limited thereby.

The presence of the bond-improving additive of the present invention in the polyester coating also has been found to give increased fire resistance to the resultant reinforced article, as well as improving the apparent heft, i.e., the aesthetic "feel," of the resultant reinforced article.

The present invention is particularly applicable to those manufacturing operations which actually apply the sprayable coating of the present invention by means of a spray gun. That is, although the sprayable coating compositions of the present invention may be applied by any of the known methods, including "hand lay-up," they can be and are preferably applied by spraying. Spray gun or "spray-up" application is quite advantageous insofar as it provides for an accelerated, high speed, low cost operation which is ideal for mass production. Certain additives, however, when mixed with sprayable thermosetting unsaturated polyester resin material may cause undesireable viscosity changes which can render the once-sprayable resin material unsuitable for spray-up application. In contrast thereto, in the present invention the viscosity of the polyester resin material is maintained, i.e., not significantly changed, by the use of the bond-improving additive of the present invention, such that the polyester resin material remains suitable for spray-up application.

DESCRIPTION OF THE PREFERRED EMBODIMENTS

The present invention is applicable to the production of glass fiber-reinforced articles of various shapes including plumbing fixtures such as bathtubs, wash basins and shower trays, as well as furniture, suitcases, boats, door and wall panels, car-top carriers, camper tops, coffins, tanks, pipes, sheeting and tubing. The present invention is particularly applicable to the production of glass fiber-reinforced plumbing fixtures wherein the reinforcing coating provides support to the thermoplastic liner sufficient to retain, at elevated temperatures during use, the strength of the plumbing fixture and the ability of the plumbing fixture to withstand deformation.

The thermosetting unsaturated polyester resin material or compositions to which the bond-improving additive of the present invention is incorporated or admixed are well known per se and may be any sprayable general purpose resin material which comprises an unsaturated polyester resin mixed with or dissolved in a polymerizable monomer which provides cross-linking units to unite the polyester chains three dimensionally. These two components react or copolymerize on introduction of a peroxide or equivalent free radical catalyst to form a rigid, infusible thermoset material.

The term "sprayable," is used herein and defined hereby as indicating thermosetting unsaturated polyester resin coating compositions which may be sprayed onto a substrate or body. It should be understood that these coating compositions may be sprayable before the bond-improving additive is admixed therein, in which case the viscosity of the composition remains substantially the same, or that these coating compositions may be made sprayable after the bond-improving additive is admixed therein. In the latter case, the coating composition may be made sprayable by lowering its viscosity by the addition of additional cross-linking monomer.

The particular thermosetting unsaturated polyester resin material employed is usually chosen according to the ultimate application or use of the resulting reinforced article.

The terminology, "unsaturated," indicates that unbroken carbon-carbon double bonds are carried over from the original ester-forming ingredients or reactants into the finished polyester resin to provide points of reactivity for the polymerizable monomer. These double bonds are opened up by the catalyst and united with similar reactive chemical groups or units of the monomer.

The unsaturated polyester resin per se is usually prepared by the esterification of polybasic acids with polyhydric alcohols to give polyesters in which either the alcoholic or the acidic portion thereof possess the ethylenic unsaturation. The preferred class of unsaturated polyester resins is derived from the esterification reaction of (1) unsaturated polybasic acids, preferably in combination with saturated aliphatic or aromatic polybasic acids, and (2) polyhydric alcohols.

The unsaturated polybasic acid may be any unsaturated polybasic acid containing two or more carboxyl groups (COOH) and having at least one doubly bonded pair of adjacent carbon atoms

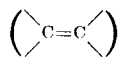

as a part of the aliphatic, or aliphatic portion, of the acid. The term "unsaturated polybasic acid" as defined here also includes the corresponding anhydrides which contain one less molecule of water than the straight acids, e.g., maleic anhydride is the anhydride corresponding to maleic acid.

The preferred unsaturated polybasic acids include the alpha-unsaturated, alpha, beta-dicarboxylic acids such as maleic acid, fumaric acid, itaconic acid, citraconic acid, and their corresponding anhydrides. Maleic acid or its anhydride is most preferred.

The unsaturated polybasic acid may be replaced in part with an equivalent quantity of one or more saturated polybasic acids, such as succinic, adipic, sebacic, phthalic, azelaic, tetrahydrophthalic, and endomethylene tetrahydrophthalic acids and their corresponding anhydrides. Other saturated acids include isophthalic, tetrachlorophthalic, chlorendic, hexahydrophthalic, glutaric and pimelic acids, and their corresponding anhydrides. The use of saturated polybasic acids modifies to some extent the rigidity introduced into the cured polyester coating by the unsaturated polybasic acids.

The polyhydric alcohols may be any polyhydric alcohol or glycol having two or more hydroxy groups (OH) and which react with either type of polybasic acid to form the corresponding polyester resin. Polyhydric alcohols which may esterified with the above-described polybasic acids include glycerol, ethylene glycol, diethylene glycol, triethylene glycol, propylene glycol, dipropylene glycol, 1,4-butylene glycol, 1,3-butylene glycol, 2,3-butylene glycol, bisphenol A, hydrogenated bisphenol A, pentaerythritol, 1,4-butadiol, 1,5-pentanediol, and neopentyl glycol. The lower aliphatic glycols such as ethylene glycol, propylene glycol, and diethylene glycol are preferred.

The manner of making the unsaturated polyester resin from the above-described polybasic acids and polyhydric alcohols is well known and is not a part of the present invention per se. For further explanation of unsaturated polyester resins and methods for making them, see Golding, *Polymers and Resins*, D. Van Nostrand Co., New York (1959); and Oleesky and Mohr, *Handbook of Reinforced Plastics*, Reinhold, New York (1964), both of which are incorporated herein by reference for sake of brevity and clarity.

The most commonly used or thoroughly investigated monomers in which the polyester resin is mixed with or dissolved in to form the thermosetting material and which act as cross-linkers include styrene, methyl methacrylate, vinyltoluene, alpha-methyl styrene, dichlorostyrene, divinylbenzene, diallylphthalate, and triallyl cyanurate. Other monomers which may be used include methyl acrylate, ethyl acrylate, vinyl acetate, N-vinyl pyrrolidone, maleimide, triallyl aconitate and triallyl phosphate.

The above-described thermosetting unsaturated polyester resin material usually contains some type or types of stabilizing or polymerization-retarding inhibitors to prevent premature or too rapid polymerization or curing. Suitable stabilizing inhibitors may include hydroquinone, tert-butyl catechol, and phenyl hydrazine hydrochloride. Other inhibitors which may be used are listed in the *Handbook of Reinforced Plastics*, supra at pages 31 to 33.

Wide and diverse catalyst-promoter systems and curing conditions may be used with the above-described thermosetting unsaturated polyester resin material. The particular catalyst-promoter system is chosen according to the particular application of the resin and the type of cure desired.

In general, any free radical catalyst which can open up the double bonds in the polyester linear chain to set in motion that portion of the polymerization or curing process designated as initiation is suitable. Usually, organic peroxides are employed as catalysts in most applications of the unsaturated polyester resin material and the corresponding curing conditions, e.g., temperatures and curing times, may be predicted and are well known. For example, the ketone peroxides such as methyl ethyl ketone peroxide, cyclohexanone peroxide, and bis(1-hydroxy cyclohexyl) peroxide; and the diacyl peroxides such as benzoyl peroxide, lauroyl peroxide and acetyl peroxide, may be used.

Further, certain "promoters" are often used to activate decomposition of the above-described peroxide catalysts at temperatures below the normal decomposition and activation temperature of the particular peroxide. Promoter systems for these peroxides are well known. In the case of methyl ethyl ketone peroxide, for example, N-N-dimethyl para-toluidine, dimethyl aniline, diethyl aniline, lauryl mercaptan, cobalt naphthenate, and manganese naphthenate may be used as promoters.

A further description of the well known catalyst-promoter systems and corresponding curing conditions for thermosetting unsaturated polyester resin material may be found in the *Handbook of Reinforced Plastics*, supra at pages 30 to 51.

Prior to applying the above-described thermosetting unsaturated polyester resin material to the thermoplastic body or substrate, the bond-improving additive consisting of a monomeric styrene compound and finely divided chalk or talc is admixed with the resin material to improve the subsequent bonding which takes place between the coating and the substrate.

The term "monomeric styrene compound" as used herein is meant to mean styrene itself, or a polymerizable derivative thereof including vinyltoluene, alpha-methylstyrene, the ethyl substituted styrenes such as alpha-ethylstyrene, and the mono and dichloro nuclear-substituted styrenes such as 4-chloro-1-vinylbenzene.

The term "chalk" as used herein is meant to include synthetic or naturally occurring calcium carbonate. Naturally occurring chalk is composed of the calcareous remains of minute marine organisms and may vary in composition properties and appearance ranging in color from snow-white to a dull white or gray and usually contains calcium carbonate in the form of calcite, the most common form of natural calcium carbonate, with silica, quartz, feldspar, zircon, rutile and other minerals as minor impurities.

The term "talc" as used herein is meant throughout the specification to include naturally occuring or synthetic talc, also sometimes referred to as talcum or hydrous magnesium silicate. The talc may have a white or whitish appearance, a hardness of 1 to 1.5 and a specific gravity of from about 2 to about 3. Naturally occurring talc may be found in Canada and in the states of New York, North Carolina, California, Vermont, Georgia, Maryland, Virginia, Nevada, Montana, Texas, and Washington, and may be obtained commercially in several different grades. For a general description of chalk and talc, see the *Handbook of Reinforced Plastics*, supra at pages 257 to 262.

The chalk or talc should be finely divided in a form suitable for homogeneous admixture with the thermosetting polyester resin material. The chalk or talc, for example, may have a particle size distribution such that 100 percent of the material is finer than 30 mesh, and preferably such that at least 90 percent thereof is finer than 200 mesh.

The monomeric styrene compound and the chalk or talc may be incorporated into the thermosetting unsaturated polyester resin material in a weight ratio of monomeric styrene compound to chalk or talc, or a mixture of the two, in the range of about 10 to about 0.1, preferably about 5 to about 0.2, and most preferably from about 1 to about 0.3, parts of styrene compound for each part chalk or talc.

For example, the monomeric styrene compound and the chalk or talc may be added to the thermosetting resin material in the above weight ratios such that from about 5 to 30 percent, and preferably 10 to 20 percent, monomeric styrene compound is added, and such that from 5 to 50 percent, and preferably 10 to 30 percent, chalk or talc is added to the thermosetting resin material.

Of course, coating compositions of the present invention may also contain, if desired, various coloring pigments, stabilizers, and the like, which do not materially affect the sprayability, strength-imparting, and bonding qualities of the coating compositions.

The above-described thermosetting coating compositions of the present invention may be applied to one or more surfaces of bodies or substrates of various thermoplastic materials such as the acrylic and acrylonitrile-butadiene-styrene (ABS) synthetic resins or plastics. As previously mentioned, the body to which the coating is applied may be in any form such as a sheet, tubing or other shaped article.

Laminated bodies or substrates, formed by bonding one thermoplastic resin to another thermoplastic resins of the same or different type, may also be coated. For example, a laminate may be formed by bonding one acrylic sheet to another acrylic sheet or by bonding an acrylic sheet to an ABS sheet and one or more surfaces of the laminate coated with the thermosetting coating compositions of the present invention. The bonding of the thermoplastic materials to each other is well known to those skilled in the art and does not form a part of the present invention. The laminate, of course, may be formed in any desired shape before coating.

Substrates of other thermoplastic materials such as polyvinyl chloride, polystyrene, polyvinylidene chloride, the polyamides such as nylon 66, polyesters such as polyethylene terephthalate, polyolefins such as polyethylene and polypropylene, and cellulose acetate may also be used in the present invention.

Advantageously, the above-described thermosetting coating composition of the present invention is especially suitable for reinforcing articles shaped or formed from acrylic material. The term "acrylic" as used herein is meant to include those resins made by the polymerization of acrylic monomers, especially of methacrylic esters such as ethyl methacrylate and methyl methacrylate. These widely used acrylic materials are probably best known by the tradenames given by their major producers, such as "SWEDCAST" (Swedlow, Inc.), "KYDEX" (Rohm and Haas), "LUCITE" (duPont), "PERSPEX" (Imperial Chemical Industries) and "RIGIDITE" American Cyanamide). They are, for the most part, methyl methacrylate polymer in sheet form.

The thermoplastic materials may be formed or shaped into the desired body configuration in any convenient manner such as vacuum forming, extrusion, injection molding, blow molding, machining, cutting, or simple pressure shaping. Preferably, when forming articles from thermoplastic sheeting it is thermally shaped or "thermoformed." Vacuum drawing the thermoplastic sheeting into a self-supporting hollow body defining an open or open-topped cavity therein is specifically preferred. Vacuum forming per se, sometimes referred to as vacuum deep-drawing, is well known in the art and is not as such a part of the present invention. For further discussion of vacuum forming, see *Plastics Engineering Handbook*, 3rd Edition, Reinhold, New York (1960), pages 91 to 117.

As indicated above, the sprayable thermosetting unsaturated polyester resin material or coating may be applied to the thermoplastic body or substrate by any convenient means, such as by a "hand lay-up" or "spray-up" technique.

Preferably, when vacuum forming is being used, the thermoplastic body is removed from the means for vacuum forming prior to hand laying up or spraying up so that a higher production rate from the vacuum forming means may be allowed. Thus, manufacture is not delayed by tying up the vacuum former during the coating and curing operations. Where such vacuum forming is combined with a spray-up operation, an accelerated continuous process is obtained.

Subsequent to or concurrently with the application of the coating, the glass fibers, in an amount of, for example 10 to 40 percent, may be embedded in the coating to impart reinforcement thereto. Most preferably, a glass fiber-free layer of the sprayable thermosetting coating material is first applied to the substrate, and then additional sprayable thermosetting coating material and glass fibers are applied concurrently to the substrate. In this manner, the glass fibers are thoroughly covered or "wetted out" with the thermosetting coating material and any direct contact of "dry" glass fibers with "bare" substrate is prevented and better bonding is achieved between the coating and the substrate.

After the first glass fiber-free layer and the second glass fiber-containing layer of thermosetting coating material have been applied, subsequent layers of either or both of the glass fiber-free and glass fiber-containing layers may be applied if desired.

Preferably, the coating is applied by means of a spray gun or "spray-up" system wherein typically sprayable resin material is pumped directly from a container to a spray gun where it is catalyzed automatically, with the resin and catalyst contacting in a mixing chamber inside the gun head. The sprayable thermosetting unsaturated polyester resin material normally has a slightly lower viscosity than resin material suitable for only hand lay-up, with a viscosity of about 3 poise considered nominal for most spray-up applications. The glass fiber, usually in roving form, is fed to a chopper attached to the spray gun whereby chopped fiber glass may be sprayed simultaneously with the catalyzed resin. Spray-up systems of this type are well known in the art.

The glass fiber reinforcement used may be in any convenient form including woven or non-woven fabrics or mattings, bulk, chopped, or milled fibers, and rovings including yarns and beams. Usually the glass fiber reinforcing material is treated with sizes or finishes to promote maximum adhesion to the particular thermosetting resin being used. In a spray-up system, glass fiber roving usually comprises the sole reinforcing material for the coating. One, two or three 60-end glass fiber roving packages may be used simultaneously.

After the thermosetting coating has been applied to the thermoplastic body or substrate, and the glass fibers have been embedded in the coating, the composite article is allowed to cure or set. Curing conditions vary with the particular thermosetting resin material being used. Preferably, a thermosetting resin material which cures or hardens rapidly, e.g., from 0.5 to 2 hours, and at ambient conditions, e.g., in air at 25°C and 760 mm Hg pressure, is employed.

The present invention is further illustrated by the following examples; all parts and percentages are by weight in the examples and throughout the specification and claims unless otherwise indicated.

EXAMPLE I

A poly(methyl methacrylate) sheet is vacuum formed in the form of a bathtub, and then removed from the vacuum forming apparatus for spray coating. Prior to spraying, a sprayable general purpose thermosetting unsaturated polyester resin material or "gun resin" is mixed with 25 percent chalc and 20 percent styrene. The viscosity of the thermosetting resin material remains substantially the same, suitable for application by means of a spray gun. A first coating of the resulting fluid thermosetting coating composition is applied to the outer surface of the acrylic bathtub, with a 60-end glass fiber roving then being fed to the spray gun where it is chopped and sprayed concurrently onto the bathtub with additional thermosetting resin coating material. The resulting glass fiber reinforced plastic bathtub is then allowed to cure at ambient conditions (25°C) until the outer coating has hardened.

EXAMPLE II

A thermosetting unsaturated polyester resin is prepared reacting 72 parts maleic anhydride, 18 parts phthalic anhydride, and 100 parts ethylene glycol at 210°C until the reaction substantially goes to completion (the acid number dropped to slightly less than 50 mg. KOH/gm.) To this resin is added 0.01 percent hydroquinone inhibitor, 0.5 percent cobalt naphenate promoter and 50 percent styrene cross-linker monomer. About 25 percent talc and 20 percent additional styrene are then mixed in with the resin material.

The resulting thermosetting coating material is then fed from a tank to a spray gun. In the atomizing section of the spray gun the resin coating material is mixed with 1 percent undiluted methylethyl ketone peroxide and about 33 percent glass fibers which are chopped to about one to two inch lengths at the gun from a 60-end roving. The resin material and the chopped glass fiber are sprayed onto a vacuum-formed 0.030 inch thick acrylic camper top to a coating thickness of 0.25 inches. After spraying, the coating is rolled with a 9 inch conventional resin roller to remove any entrapped air and to embed any glass fiber sticking out from the surface. The rolling helps prevent any "soft spots" from occurring in the cured coating. The coating is then allowed to cure at ambient temperature.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A glass fiber-reinforced plastic article which comprises a layer of a resin selected from the group consisting of acrylic resins and acrylonitrile-butadiene-styrene resins; and a cured coating of sprayable thermosetting unsaturated polyester resin material, and a bond-improving additive of monomeric styrene compound and chalk or talc or a mixture thereof, said cured coating having embedded therein glass fibers and being in direct contact with at least a portion of said layer of said resin and being bonded thereto with improved strength.

2. An article according to claim 1 wherein said resin of said layer is selected from the group of methyl methacrylate, ethyl methacrylate, and acrylonitrile-butadiene-styrene.

3. A reinforced plastic article comprising a layer of an acrylic resin or an acrylonitrile-butadiene-styrene resin, and a cured coating of sprayable thermosetting unsaturated polyester resin material including a bond-improving additive of from 5 to 30 weight percent of monomeric styrene compound, from 5 to 50 weight percent of finely divided chalk or talc or a mixture thereof, and said cured coating having embedded therein glass fibers and being in direct contact with at least a portion of said layer of acrylic or acrylonitrile-butadiene-styrene resin and being bonded thereto with improved strength.

4. An article according to claim 3 wherein the weight ratio of monomeric styrene compound to talc or chalk in said sprayable resin material is from 0.1 to 10 parts per one per part talc or chalk.

5. An article according to claim 3 wherein the resin of the said layer of resin is selected from the group of methyl methacrylate, ethyl methacrylate, and acrylonitrile-butadiene-styrene.

6. An article according to claim 1 wherein said resin is an acrylic resin.

7. An article according to claim 1 wherein said resin is an acrylonitrile-butadiene-styrene resin.

8. An article according to claim 3 wherein said layer is an acrylic resin.

9. An article according to claim 3 wherein said layer is of an acrylonitrile-butadiene-styrene resin.

10. An article according to claim 1 wherein the ratio of styrene compound to chalk or talc is in the range of from 10 parts to 0.1 parts styrene compound for each part chalk or talc, wherein about 5 to 50 percent of chalk or talc is present in the coating, and wherein about 5 to 30 percent monomeric styrene compound additive is present in the coating.

* * * * *